United States Patent
Kang

(10) Patent No.: US 10,134,173 B2
(45) Date of Patent: Nov. 20, 2018

(54) TEXTURE PROCESSING METHOD AND UNIT

(71) Applicant: Samsung Electronics Co., Ltd., Suwon-si (KR)

(72) Inventor: Seok Kang, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 128 days.

(21) Appl. No.: 15/146,302

(22) Filed: May 4, 2016

(65) Prior Publication Data

US 2017/0103566 A1    Apr. 13, 2017

(30) Foreign Application Priority Data

Oct. 12, 2015    (KR) .................. 10-2015-0142231

(51) Int. Cl.
*G06T 15/50* (2011.01)
*G06T 15/04* (2011.01)
*G06T 15/00* (2011.01)
*G06T 15/80* (2011.01)

(52) U.S. Cl.
CPC ............ *G06T 15/04* (2013.01); *G06T 15/005* (2013.01); *G06T 15/80* (2013.01); *G06T 2200/04* (2013.01); *G06T 2200/12* (2013.01); *G06T 2207/20004* (2013.01); *G06T 2207/20024* (2013.01)

(58) Field of Classification Search
None
See application file for complete search history.

(56) References Cited

U.S. PATENT DOCUMENTS

| 5,566,284 | A | 10/1996 | Wakayama | |
| 5,852,446 | A * | 12/1998 | Hashimoto | G06T 15/50 345/441 |
| 6,226,051 | B1 * | 5/2001 | Beattie | H04N 5/21 348/607 |
| 6,236,405 | B1 | 5/2001 | Schilling et al. | |
| 6,453,074 | B1 | 9/2002 | Zheng | |

(Continued)

FOREIGN PATENT DOCUMENTS

| GB | 2516682 | 2/2015 |
| JP | 2002-112051 A | 4/2002 |

(Continued)

OTHER PUBLICATIONS

European Search Report dated Mar. 17, 2017 issued in corresponding European Application No. 16193551.5.

(Continued)

*Primary Examiner* — Anh-Tuan V Nguyen
(74) *Attorney, Agent, or Firm* — F. Chau & Associates, LLC

(57) ABSTRACT

A texture processing unit includes a controller configured to obtain a texture coordinate and spatial frequency information for each channel of a texture corresponding to the texture coordinate, and determine a filtering control signal for each channel of the texture based on the spatial frequency information for each channel, and a texture filter configured to perform filtering for each channel of the texture according to the filtering control signal for each corresponding channel.

22 Claims, 14 Drawing Sheets

(56) References Cited

U.S. PATENT DOCUMENTS

| | | | |
|---|---|---|---|
| 6,654,504 B2* | 11/2003 | Lubin | G06T 5/50 382/254 |
| 6,690,418 B1* | 2/2004 | Terasawa | H04N 5/3653 348/235 |
| 7,113,206 B2 | 9/2006 | Nakakuki | |
| 7,599,975 B1* | 10/2009 | Donovan | H03M 7/14 708/203 |
| 8,503,810 B2* | 8/2013 | Noguchi | H04N 19/115 382/250 |
| 8,526,730 B2* | 9/2013 | Hashimoto | G09G 3/3607 382/167 |
| 8,934,713 B2 | 1/2015 | Sawada et al. | |
| 9,230,361 B2 | 1/2016 | Ishibashi | |
| 2002/0039142 A1* | 4/2002 | Zhang | H04N 1/60 348/234 |
| 2002/0041331 A1* | 4/2002 | Xiaomang | H04N 9/045 348/234 |
| 2002/0080143 A1* | 6/2002 | Morgan | G06T 17/00 345/581 |
| 2003/0160799 A1* | 8/2003 | Emberling | G06T 5/20 345/582 |
| 2004/0061710 A1* | 4/2004 | Messing | G06T 3/4015 345/698 |
| 2005/0200630 A1* | 9/2005 | Evans | H04N 19/61 345/589 |
| 2006/0133697 A1* | 6/2006 | Uvarov | G06T 11/001 382/300 |
| 2007/0013786 A1* | 1/2007 | Chiba | H04N 9/045 348/222.1 |
| 2007/0070225 A1* | 3/2007 | Sei | H04N 9/045 348/273 |
| 2007/0103487 A1* | 5/2007 | Watson | G06T 15/005 345/609 |
| 2011/0069192 A1* | 3/2011 | Sasaki | H04N 9/045 348/222.1 |
| 2012/0050583 A1* | 3/2012 | Watanabe | G06T 5/003 348/241 |
| 2013/0063440 A1 | 3/2013 | Son et al. | |
| 2013/0077862 A1* | 3/2013 | Nomura | H04N 9/045 382/167 |
| 2014/0050415 A1* | 2/2014 | Sims | G06T 5/001 382/260 |

FOREIGN PATENT DOCUMENTS

| | | |
|---|---|---|
| JP | 4641675 B2 | 3/2011 |
| KR | 10-1356286 B1 | 1/2014 |
| WO | WO 2013/005366 A1 | 1/2013 |

OTHER PUBLICATIONS

Chih-Hao Sun et al: "High-Quality Mipmapping Texture Compression with Alplha Maps for Graphics Processing Units", IEEE Transactions on Multimedia, IEEE Service Center, Piscataway, NJ, US, vol. 11, No. 4, 2009, pp. 589-599, XP011346603, ISSN: 1520-9210, DOI:10.1109/TMM.2009.2017637.

Silpa B V N et al: "Texture Filter Memory-a power-efficient and scalable texture memory architecture for mobile graphics processors", Computer-Aided Design, 2008. ICCAD 2008. IEEE/ACM International Conference on, IEEE, Piscataway, NJ, USA, 2008, pp. 559-564, XP031398698, ISBN: 978-1-4244-2819-9.

Wikipedia, "Aliasing", http://en.wikipedia.org/wiki/Aliasing, Mar. 2016, 7 pages in English.

Wikipedia, "Anisotropic filtering", http://en.wikipedia.org/wiki/Anisotropic filtering, Mar. 2016, 4 pages in English.

* cited by examiner

X Sampling Points

R Channel
= (1/8, 1/8)

G Channel
= (1/2, 1/2)

B Channel
= (1/4, 1/4)

A Channel
= (0, 0)

TEXTURE PROCESSING METHOD AND UNIT

CROSS-REFERENCE TO RELATED APPLICATION

This application claims the benefit under 35 USC 119(a) of Korean Patent Application No. 10-2015-0142231, filed on Oct. 12, 2015, in the Korean Intellectual Property Office, the entire disclosure of which is incorporated herein in by reference for all purposes.

BACKGROUND

1. Field

The present disclosure relates to a texture processing method and unit.

2. Description of the Related Art

A graphics processing unit (GPU) may include a texture processing unit to accelerate three-dimensional graphic rendering.

The texture processing unit may generate a texture for texturing. The texturing is the applying of a previously prepared image to an object formed in a three-dimensional space, and may be a three-dimensional graphic rendering operation used to decrease the amount of calculations, thereby increasing processing speed. In this case, the previously prepared image is referred to as a texture, and the texture may be previously prepared in a compressed form and stored in an external memory of the texture processing unit.

SUMMARY

Provided is a texture processing method and unit for performing texture filtering which is independent of each channel based on spatial frequency information for each channel of a texture.

Additional aspects will be set forth in part in the description which follows and, in part, will be apparent from the description, or may be learned by practice of the presented exemplary embodiments.

A texture processing unit includes a controller configured to obtain a texture coordinate and spatial frequency information for each channel of a texture corresponding to the texture coordinate, and determine a filtering control signal for each channel of the texture based on the spatial frequency information for each channel, and a texture filter configured to perform filtering for each channel of the texture according to the filtering control signal for each corresponding channel.

The controller may determine the filtering control signal independently for each channel in response to a spatial frequency for each channel included in the spatial frequency information for each channel being different.

The controller may determine the filtering control signal for each channel such that anti-aliasing filtering based on a spatial frequency of a channel is performed on a channel satisfying a predetermined condition determining that an aliasing phenomenon occurs in the channel.

The spatial frequency information for each channel may be generated and stored together in response to the texture being generated, and the controller may obtain the spatial frequency information for each corresponding channel from an external memory in which the texture is stored.

The spatial frequency information for each channel may be determined in real time in response to texturing being performed by a graphics processing unit comprising the texture processing unit, and the controller may obtain the spatial frequency information for each respective channel from the graphics processing unit.

The controller may obtain a sampling frequency for the texture, determine a channel having the highest spatial frequency as a reference channel based on the spatial frequency information for each channel, determine the filtering control signal of the reference channel based on the spatial frequency of the reference channel and the sampling frequency, compare the spatial frequency of the reference channel and spatial frequencies of other channels excluding the reference channel, and determine the filtering control signals of the other channels excluding the reference channel.

The controller may obtain a sampling frequency for the texture, compare the spatial frequency for each channel included in the spatial frequency information for each channel and the sampling frequency, and determine the filtering control signal for each channel.

The texture filter may independently operate at least one filter corresponding to each channel based on the filtering control signal for each respective channel.

The texture filter may include a first filter including anti-aliasing filters corresponding to channels configuring the texture and a second filter including filters performing a filtering according to a filtering mode, and may operate the first filter and the second filter for each channel according to the filtering control signal for each channel.

The filtering control signal for each channel may include a control signal for each channel for anti-aliasing filtering, and a control signal for each channel for a filtering mode.

The texture processing unit may further include a texture cache configured to store the texture.

A texture processing method includes obtaining a texture coordinate and spatial frequency information for each channel of a texture corresponding to the texture coordinate, determining a filtering control signal for each channel of the texture based on the spatial frequency information for each channel, and performing filtering for each channel of the texture according to the filtering control signal for each corresponding channel.

The determining of the filtering control signal for each channel may include determining the filtering control signal independently for each channel in response to a spatial frequency for each channel included in the spatial frequency information for each channel being different.

The determining of the filtering control signal for each channel may include determining the filtering control signal for each channel so that anti-aliasing filtering based on a spatial frequency of a channel is performed on a channel satisfying a predetermined condition that determines if an aliasing phenomenon occurs.

The spatial frequency information for each channel may be generated and stored together in response to the texture being generated, and the obtaining of the texture coordinate and the spatial frequency information for each channel may include obtaining the spatial frequency information for each channel from an external memory in which the texture is stored.

The spatial frequency information for each channel may be determined in real time in response to texturing being performed in a graphics processing unit comprising the texture processing unit, and the obtaining of the texture coordinate and the spatial frequency information for each channel may include obtaining the spatial frequency information for each respective channel from the graphics processing unit.

The determining of the filtering control signal for each channel may include obtaining a sampling frequency for the texture, determining a channel having the highest spatial frequency as a reference channel based on the spatial frequency information for each channel, determining the filtering control signal of the reference channel based on the spatial frequency of the reference channel and the sampling frequency, and comparing the spatial frequency of the reference channel and spatial frequencies of other channels excluding the reference channel, and determining the filtering control signals of the other channels excluding the reference channel.

The determining of the filtering control signal for each channel may include obtaining a sampling frequency for the texture, and comparing the spatial frequency for each channel included in the spatial frequency information for each channel and the sampling frequency, and determining the filtering control signal for each respective channel.

The performing of the filtering for each channel may include operating a first filter comprising anti-aliasing filters corresponding to channels configuring the texture and a second filter comprising filters performing filtering according to a filtering mode, for each channel according to the filtering control signal for each respective channel.

The filtering control signal for each channel may include a control signal for each channel for anti-aliasing filtering and a control signal for each channel for a filtering mode.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
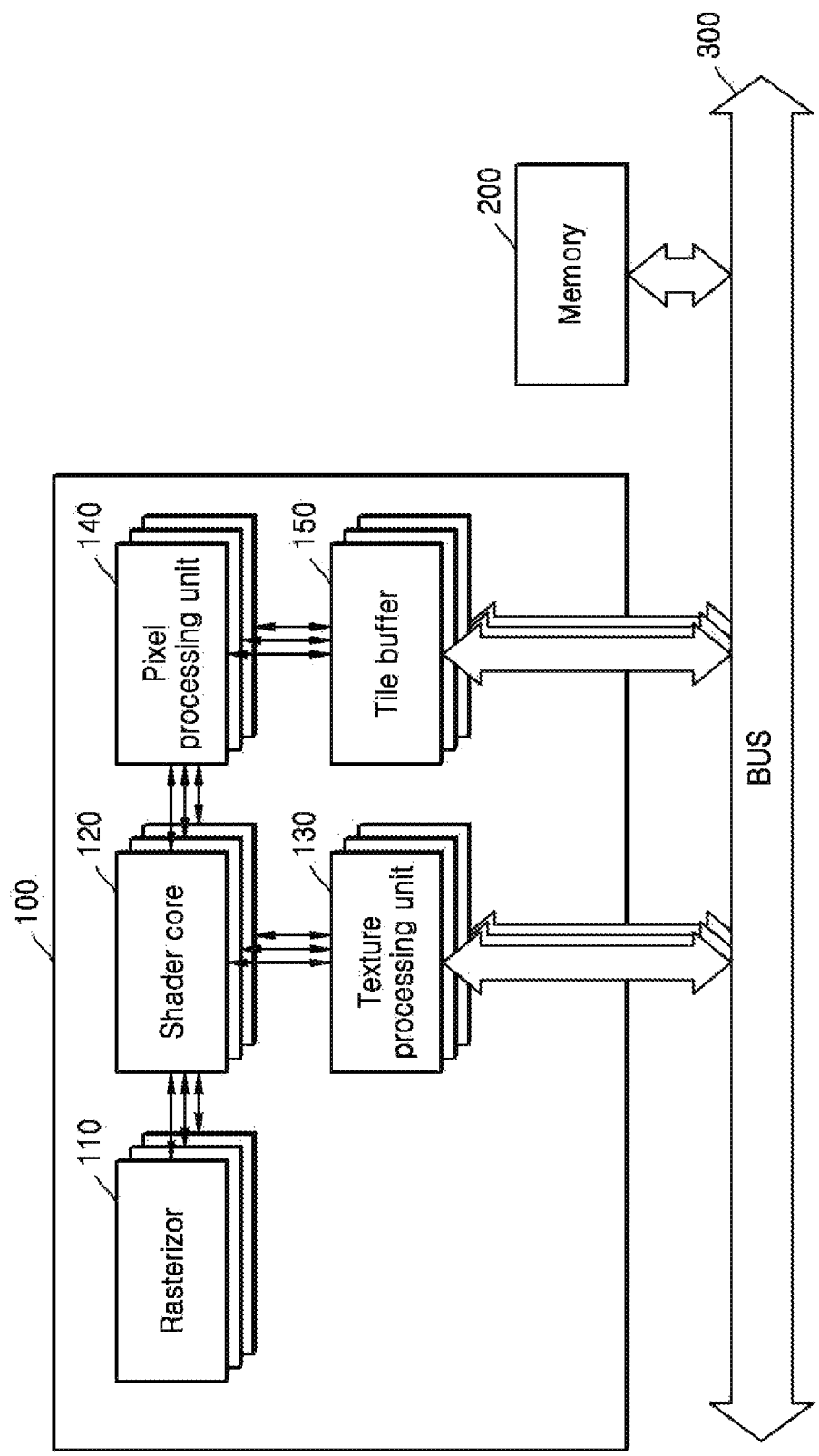
FIG. 1 is a diagram illustrating a graphics processing unit according to an embodiment.

FIG. 1 is a diagram illustrating a graphics processing unit according to an embodiment. It may be understood to those of ordinary skill in the art, upon a full understanding of the present specification, that other general-purpose components may be further included in addition or in the alternative to components shown in FIG. 1.

Referring to FIG. 1, a graphics processing unit (GPU) 100 may include a rasterizor 110, a shader core 120, a texture processing unit 130, a pixel processing unit 140, and a tile buffer 150. The graphics processing unit 100 may transceive data with a memory 200 located outside the GPU 100 through a bus 300.

The graphics processing unit 100 shown in FIG. 1 may be an apparatus for processing a three-dimensional graphic, and may use a tile-based rendering (TBR) method. In other words, the graphics processing unit 100 may store a processing result in the tile buffer 150 by controlling a plurality of tiles divided into predetermined sizes to be processed through the rasterizor 110, the shader core 120, and the pixel processing unit 140 in order to generate a three-dimensional graphic corresponding to one frame. The graphics processing unit 100 may process all the tiles configuring the frame in parallel using a plurality of pipelines, and each pipeline may be configured by (e.g. contain) the rasterizor 110, the shader core 120, and the pixel processing unit 140. The graphics processing unit 100 may transmit the processing result stored in the tile buffer 150 to a frame buffer 18 (see FIG. 2) of the memory 200 when the plurality of tiles corresponding to one frame is processed.

The rasterizor 110 may perform rasterization on a primitive generated from a vertex shader (see 12 in FIG. 2) by a geometric conversion operation.

The shader core 120 may receive the rasterized primitive from the rasterizor 110, and perform pixel shading. The shader core 120 may perform pixel shading to assign colors of all pixels included in the tile with respect to tiles including fragments of the primitive generated by the rasterization. The shader core 120 may use a pixel value generated using the texture to generate a realistic three-dimensional graphic in the pixel shading operation.

The shader core 120 may include a pixel shader. Further, the shader core 120 may further include a vertex shader, or be a combined shader, combining the vertex shader and a pixel shader (see 15 in FIG. 2). The shader core 120, when performing as a vertex shader, may generate a primitive representing an object, and transmit the generated primitive to the rasterizor 110.

When the shader core 120 makes a request for the texture processing unit 130 to transmit a pixel value corresponding to a pixel, the texture processing unit 130 may transmit a pixel value generated by processing a pre-prepared texture. The texture may be stored in a predetermined space inside or outside the texture processing unit 130, or in the memory 200 of the graphics processing unit 100. When the texture used to generate the pixel value requested by the shader core 120 is not in the predetermined space inside the texture processing unit 130, the texture processing unit 130 may fetch the texture from the space outside the texture processing unit 130 and use the texture or the memory 200.

The pixel processing unit 140 may determine all the pixel values corresponding to one tile by determining the pixel value that is finally displayed through an operation such as a depth test, etc. on the pixels corresponding to the same position in one tile.

The tile buffer 150 may store all the pixel values corresponding to one tile transmitted from the pixel processing unit 140. When the graphics processing operation is completed on all the tiles included in one frame, the processing result stored in the tile buffer 150 may be transmitted to the frame buffer 18 (see FIG. 2) of the memory 200.

Figure 2:
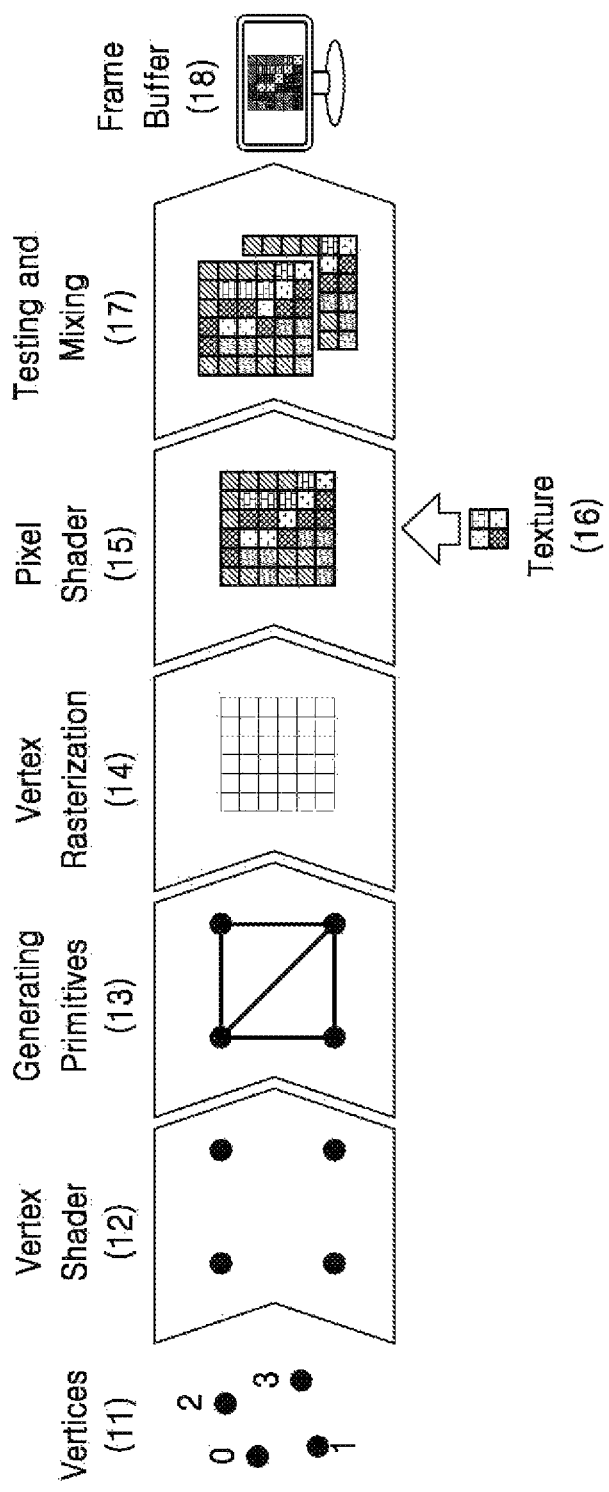
FIG. 2 is a diagram describing an operation of processing a three-dimensional graphic by a graphics processing unit according to an embodiment.

FIG. 2 is a diagram describing an operation of processing a three-dimensional graphic by a graphics processing unit according to an embodiment.

The operation of processing the three-dimensional graphic may be divided into geometry conversion, rasterization, and pixel shading, and will be described below with reference to FIG. 2. Referring to FIG. 2, the operation of processing the three-dimensional graphic will be represented by operations 11 to 18.

Operation 11 is an operation of generating vertices. The vertices are generated to represent objects included in the three-dimensional graphic.

Operation 12 is an operation of shading the generated vertices. The vertex shader may perform the shading on the vertices by specifying positions of the vertices generated in operation 11.

Operation 13 is an operation of generating primitives. Primitive refers to a point, a line, a polygon, etc. formed using at least one vertex. As an example, the primitive may represent a triangle formed by connecting the vertices, but may represent different shapes such as a quadrilateral, pentagon, etc.

Operation 14 is an operation of rasterizing the primitive. Rasterizing the primitive refers to dividing the primitive into fragments. A fragment may be a basic unit for performing a graphics processing on a primitive. Since the primitive only includes information related to the vertex, the graphics processing may be performed on a three-dimensional graphic by generating fragments between vertexes in the rasterization operation.

Operation 15 is an operation of shading a pixel. The fragments configuring the primitive generated by the rasterization may be pixels configuring the tile. The terms such as "fragment" and "pixel" may be interchangeably used in some cases. For example, the pixel shader may be referred to as a fragment shader. Generally, a basic unit of the graphics processing configuring a primitive may be referred to as a fragment, and a basic unit of the graphics processing from a pixel shading may be referred to as a pixel hereinafter. The color of the pixel may be determined in the pixel shading.

Operation 16 represents an operation of texturing for determining the color of the pixel. Texturing is a process of determining the color of a pixel using a texture, which is a pre-prepared image. Since the operation of calculating and determining the color of each pixel in order to express various colors and appearances of a pattern of the real world increases the amount of calculations and a graphics processing time needed for processing the graphic, the color of the pixel may be determined using the pre-prepared texture. For example, a surface color of an object may be stored as a separate two-dimensional image which is referred to as the texture, and the color of the pixel may be determined by enlarging and reducing the texture stored according to a position and a size, etc. of a screen of the object, or mixing texel values using textures having various resolutions.

The pixel value generated using the pre-prepared texture may be used in order to perform faster three-dimensional graphics processing during the pixel shading operation. In this case, the pixel value may be generated by pre-preparing a plurality of textures having different resolutions so as to adaptively correspond to the size of the object, and combining the plurality of textures. In this case, pre-prepared textures having different resolutions are referred to as a mipmap. For example, in order to generate the pixel values of an object having a medium resolution from two pre-prepared mipmaps, the pixel value configuring the object may be generated by extracting texel values of positions corresponding to the object from the two pre-prepared mipmaps and filtering the texel values.

Operation 17 represents an operation of testing and mixing. The pixel values corresponding to one tile may be determined by determining the pixel value which is finally displayed through the operation such as the depth test, etc. on the pixels corresponding to the same position in the one tile. A three-dimensional graphic corresponding to one frame may be generated by mixing the plurality of tiles generated through the operation.

Operation 18 represents an operation of storing the frame generated through operations 11 to 17 in the frame buffer, and displaying the frame stored in the frame buffer on a display unit.

Figure 3:
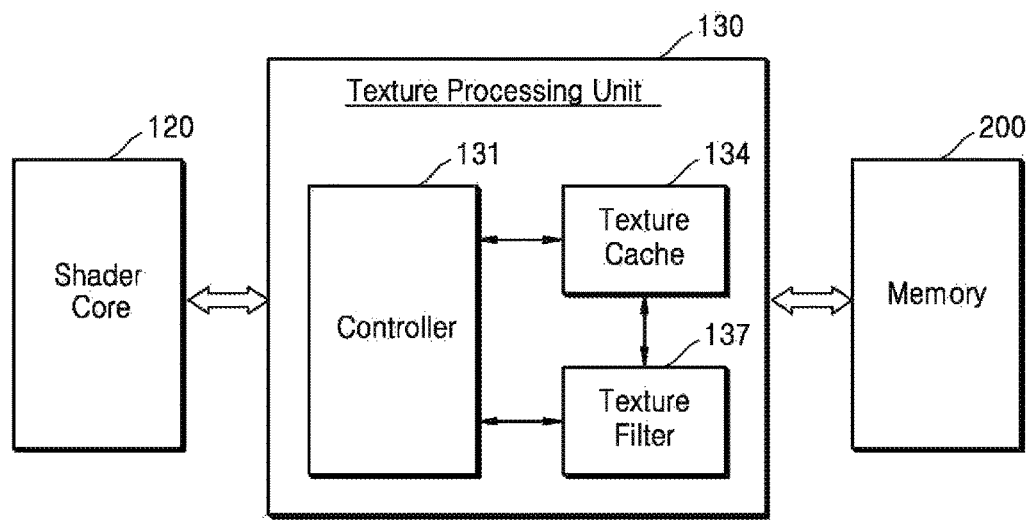
FIG. 3 is a diagram describing a configuration and an operation of a texture processing unit according to an embodiment.

FIG. 3 is a diagram describing a configuration and an operation of a texture processing unit according to an embodiment.

Referring to FIG. 3, the texture processing unit 130 may include a controller 131, a texture cache 134, and a texture filter 137.

The texture processing unit 130 may receive the texture having a compressed form from the memory 200 of the graphics processing unit 100, and may process the texture.

The controller 131 may perform an operation to control the texture processing unit 130, or may transmit a control signal to the texture cache 134 and the texture filter 137, and perform overall control of the texture processing unit 130.

The controller 131 may receive a texture coordinate corresponding to a pixel coordinate of a pixel to be processed in the shader core 120 from the shader core 120.

The controller 131 may generate a control signal so that the texture filter 137 filters texels included in a portion of a region of a texture space which includes the texture coordinate for each channel. The controller 131 may obtain spatial frequency information for each channel of the texture corresponding to the texture coordinate to generate a filtering control signal for each channel transmitted to the texture filter 137. The controller 131 may determine a filtering method for each channel of the texture according to the spatial frequency information for each channel of the texture.

Since the texture is a set of texels, and each texel has a plurality of channels corresponding to a plurality of respective color components, the texture being configured may also include a plurality of channels. The spatial frequency information for each channel of the texture may represent a change rate of an image signal of each channel included in the texture.

The spatial frequency information of a channel may represent the change rate of the image signal of a corresponding channel. Since a low spatial frequency of the channel represents a small change rate of the image signal of the corresponding channel, it may represent adjacent texels included in the texture having the same or very similar image signal values in the corresponding channel. In other words, the low spatial frequency of the channel may be referred to as a state in which a spatial correlation of the corresponding channel is high or a state in which the corresponding channel is flat. On the contrary, since a high spatial frequency of the channel represents a large change rate of the image signal of the corresponding channel, it may represent adjacent texels included in the texture having dissimilar image signal values in the corresponding channel. In other words, the high spatial frequency of the channel may be referred to as a state in which a spatial correlation of the corresponding channel is low or a state in which the corresponding channel is not flat.

FIGS. 4A, 4B, 4C, 4D, and 4E represent a diagram for describing a relation between a spatial frequency and a sampling frequency of each channel of a texture according to an embodiment.

One texture may be represented by a sum of image signals of a plurality of channels. Each channel may correspond to each color component representing an arbitrary color space. The color space may be RGBA, YCbCrA, etc.

Referring to FIGS. 4A-4E, an original texture a (shown in FIG. 4A) and respective channels b, c, d, and e (shown in FIGS. 4B, 4C, 4D, and 4E, respectively) included in the original texture a are shown. As shown in FIG. 4, when using the RGBA color space, the original texture a may be represented by a sum of an R channel b, a G channel c, a B channel d, and an A channel e.

Figure 4A:
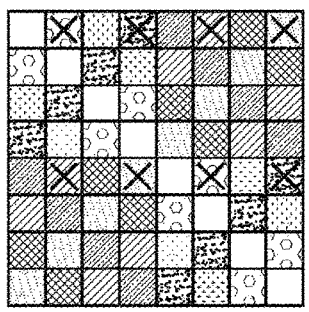
FIGS. 4A, 4B, 4C, 4D, and 4E are diagrams describing a relation between a spatial frequency and a sampling frequency of each channel of a texture according to an embodiment.

Referring to FIG. 4A, when referring to the sampling frequency in the original texture a, sampling is performed once every 2 texels in an X axis direction, and once every 4 texels in a Y axis direction. Accordingly, the X axis direction has a sampling frequency of ½, and the Y axis direction has a sampling frequency of ¼. As a result, it may be seen that one texel value is lost for every two texels in the X axis direction, and three texel values are lost for every four texels in the Y axis direction.

Figure 4B:
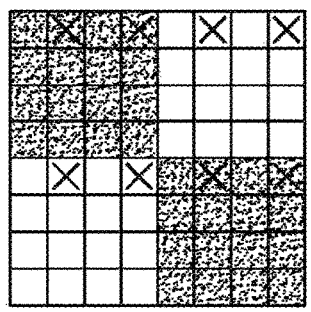

Referring to FIG. 4B, when referring to the R channel b, it may be seen that the texel values have a pattern in which there is no texel value in four consecutive texels after the same texel value is maintained for four texels in both the X axis direction and the Y axis direction. Accordingly, since 8 texels form one period in both the X axis direction and the Y axis direction, the R channel b may have the spatial frequency of ⅛ in both the X axis direction and the Y axis direction.

Figure 4C:
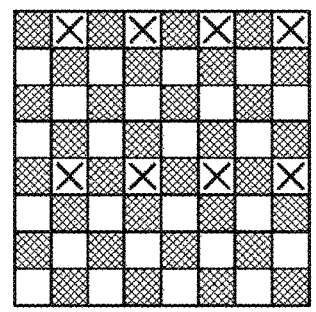

Referring to FIG. 4C, when referring to the G channel c, it may be seen that the texel values have a pattern in which the texel values of the texels continuously change in both the X axis direction and the Y axis direction, but the same texel value is repeated every two texels. Accordingly, since two texels form one period in both the X axis direction and the Y axis direction, the G channel c may have the spatial frequency of ½ in both the X axis direction and the Y axis direction.

Figure 4D:
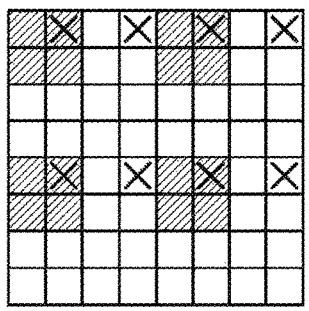

Referring to FIG. 4D, when referring to the B channel d, it may be seen that the texel values have a pattern in which there is no texel value in two consecutive texels after the same texel value is maintained for two texels in both the X axis direction and the Y axis direction. Accordingly, since four texels form one period in both the X axis direction and the Y axis direction, the B channel d may have the spatial frequency of ¼ in both the X axis direction and the Y axis direction.

Figure 4E:
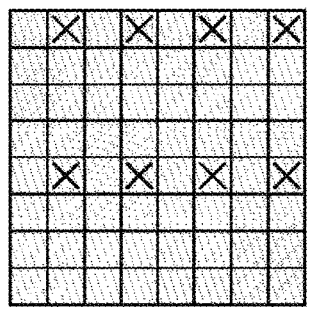

As shown in FIG. 4E, when referring to the A channel e, since every texel has the same value, the spatial frequency may be 0.

Accordingly, it may be seen that the spatial frequencies of the R channel b, the G channel c, the B channel d, and the A channel e included in the original texture a are different from each other, whereas, the sampling frequencies of the R channel b, the G channel c, the B channel d, and the A channel e are the same and are equal to the sampling frequency of the original texture a.

In each channel, since the X axis direction has the sampling frequency of ½ and the Y axis direction has the sampling frequency of ¼, one texel value every two texels may be lost in the X axis direction, and three texel values every four texels may be lost in the Y axis direction. When the sampling frequency is lower than two times the spatial frequency of each channel, a portion of the texel values may be lost, and an aliasing phenomenon may occur.

In order to minimize the aliasing phenomenon by considering only the sampling frequency without considering the spatial frequency information for each channel, the anti-aliasing filtering may be performed by assuming a condition in which the aliasing phenomenon occurs in every channel, that is, a condition in which every channel has a maximum spatial frequency. However, in this case, since the anti-aliasing filtering is performed on the channel in which the aliasing phenomenon does not actually occur, an unnecessary filtering operation is performed on a portion of the channels, and thus, increased power consumption and a frame rate loss due to a reduction in processing speed may occur.

In order to prevent the performance of unnecessary filtering operations, the controller 131 may determine a spatial filtering control signal independently for each channel based on a characteristic of each channel. The controller 131 may obtain the spatial frequency information for each channel of the texture, and may determine a filtering control signal for each channel based on the spatial frequency information for each channel.

The controller 131 may determine the filtering control signal independently for each channel when the spatial frequency of each channel included in the spatial frequency information for each channel is different. The controller 131 may determine the filtering control signal for each channel so that the anti-aliasing filtering based on the spatial frequency of the channel is performed on the channel satisfying a predetermined condition in which the aliasing phenomenon occurs.

The filtering control signal for each channel may include the control signal for each channel for the anti-aliasing filtering. The filtering control signal for each channel may further include the control signal for each channel in a filtering mode which is requested by an application program executed on a non-transitory hardware device, as well as the control signal for each channel for the anti-aliasing filtering.

As described above, the spatial frequencies of the X axis and the Y axis of the R channel b, the G channel c, the B channel d, and the A channel e included in the original texture a shown in FIG. 4 may be the same, and be ⅛, ½, ¼, and 0, respectively, and the sampling frequency for each channel may be ½ in the X axis direction and ¼ in the Y axis direction.

Accordingly, in FIG. 4, there may be no texel value lost in each channel even when one texel value every two texels is sampled in the X axis direction in the R channel b, the B channel d, and the A channel e, but, in the case of the G channel c, since the texel value is repeated every two texels and the value is changed every texel, when one texel value every two texels is sampled in the X axis direction, since only the same texel value is sampled repeatedly, a different texel value may be lost and the aliasing phenomenon may occur.

In FIG. 4, there may be no texel value lost in each channel even when one texel value every four texels is sampled in the X axis direction in the R channel b and the A channel e, but in the case of the B channel d and the G channel c, since the texel value is changed every texel or is changed every two texels, when one texel value every four texels is sampled in the Y axis direction, a portion of texel values may be lost and the aliasing phenomenon may occur.

An average value of the texels in the sampling period may be substituted for a sampling value using a low pass filter such as an average filter to minimize the aliasing phenomenon in the channel in which the aliasing phenomenon occurs in consideration of the spatial frequency information for each channel.

The spatial frequency information for each channel of the texture may be generated when generating the texture. Since the spatial frequency information for each channel may be stored together in the memory 200 in which the texture is stored, the controller 131 may obtain the spatial frequency information for each channel from the memory 200.

The texture may be stored in the memory 200 in a compressed form, and when compressing the texture by each channel, compression rate information for each channel may be generated and stored together. The controller 131 may obtain the compression rate information for each channel of the texture from a decompressor (not shown) decompressing the compressed texture transmitted from the memory 200. The controller 131 may determine the spatial frequency information for each channel of the texture based on the compression rate information for each channel. For example, when the compression rate of a channel is high, the spatial frequency of a channel may be low, and when the compression rate of a channel is low, the spatial frequency of a channel may be high, and thus the spatial frequency information may be determined using a correlation between the compression rate and the spatial frequency.

The spatial frequency information for each channel of the texture may be calculated in real time when the texturing operation is performed in the graphics processing unit 100 including the texture processing unit 130. The controller 131 may obtain the spatial frequency information for each channel from the graphics processing unit 100.

The spatial frequency information for each channel of the texture may be directly received through an application program executed in the graphics processing unit 100, which is a non-transitory hardware device.

Referring back to FIG. 3, the texture cache 134 may store the texture used in the graphics processing operation. The texture cache 134 may receive a mipmap having various resolutions regarding one texture from the memory 200, and may store the received mipmap. The texture cache 134 may extract texel values for processing a pixel value requested from the shader core 120, and transmit the extracted texel values to the texture filter 137.

The texture filter 137 may generate one pixel value by filtering the texel values transmitted from the texture cache 134. Filtering the texel values refers to obtaining the color value corresponding to the pixel by mixing the texel values.

For example, the texture filter 137 may perform the filtering by obtaining an average value of the texel values included in one portion of the texture space which includes the texture coordinate. A pixel value generated by the texture filter 137 may be a texel value filtered through a predetermined operation. The filtered texel value corresponding to the filtering result of the texture filter 137 may be transmitted to the shader core 120.

The texture filter 137 may filter the texels included in the texture by each channel. Each channel may correspond to each color component included in the texel. Since one texel may include a plurality of color components, one texel may have a plurality of channels. After performing filtering on each channel, the texture filter 137 may output a value obtained by mixing the filtering results of the channels as a final value.

The texture filter 137 may perform at least one filtering operation. When there are a plurality of filtering operations, the texture filter 137 may sequentially perform the plurality of filtering operations. The texture filter 137 may include a filter corresponding to each filtering operation.

For example, the texture filter 137 may perform antialiasing filtering and filtering according to a filtering mode requested by an application program. The texture filter 137 may perform the filtering according to the filtering mode requested by the application program after performing the anti-aliasing filtering, or perform the anti-aliasing filtering after performing the filtering according to the filtering mode requested by the application program.

The texture filter 137 may perform the same or a different filtering on each channel in each filtering operation. The texture filter 137 may apply a filtering method suitable for each channel in consideration of the characteristic of each channel in order to minimize unnecessary operations. The texture filter 137 may omit the filtering operation on a channel in which the filtering operation is determined to not be necessary. The filter corresponding to each filtering operation may include sub-filters corresponding to each channel.

For example, the texture filter 137 may perform the filtering by selecting from isotropic anti-aliasing filtering, anisotropic anti-aliasing filter, and anisotropic anti-aliasing filter with mipmap, etc. for each channel in order to prevent the aliasing phenomenon. This may be for minimizing the unnecessary filtering operations by applying the anti-aliasing filtering suitable for each channel in consideration of the characteristic of each channel.

Isotropic anti-aliasing filtering is a method of applying the same low pass filter to every direction of an image. Anisotropic anti-aliasing filtering is a method of applying a different low pass filter based on the sampling frequency to each direction of the image. Anisotropic anti-aliasing filter with mipmap is a method of preventing the aliasing phenomenon using the mipmap applied to a direction having a high sampling frequency in the image, and applying a low pass filter based on the sampling frequency to a direction having a low sampling frequency.

The texture filter 137 may perform point filtering, bilinear filtering, trilinear filtering, etc. according to the filtering mode requested by the application program. The texture filter 137 may substitute another filtering mode for the filtering mode requested by the application program in consideration of the characteristic of each channel to be filtered. This may minimize unnecessary filtering operations by substituting a relatively simple filtering mode for the filtering mode requested by the application program in consideration of the characteristic of each channel to be filtered.

Point filtering is a mode of outputting a texel located at the closest position after obtaining the predetermined number of peripheral texels based on the texture coordinate when determining the texture used for the object in which the rendering is performed. Bilinear filtering is a mode of obtaining four peripheral texels based on the texture coordinate, interpolating every two texels, interpolating the interpolated results again, and outputting the interpolated result when determining the texture used for the object in which the rendering is performed. Trilinear filtering is a mode including four texels in every two mipmap levels based on the texture coordinate, performing bilinear filtering in each mipmap, performing bilinear filtering again on the results in the two mipmaps, and outputting the result.

Figure 5:
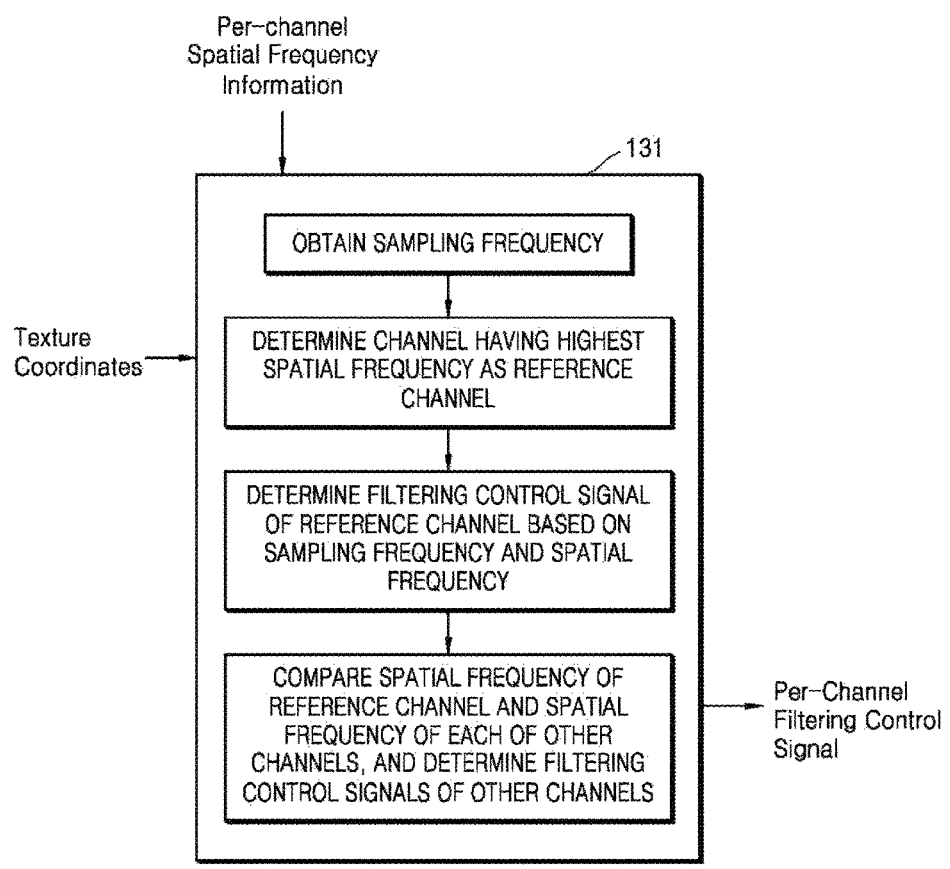
FIG. 5 is a diagram describing an operation of a controller according to an embodiment.

FIG. 5 is a diagram describing an operation of a controller according to one embodiment. FIG. 5 is a diagram describing one example in which the controller 131 determines a filtering control signal for each channel.

Referring to FIG. 5, the controller 131 may obtain spatial frequency information for each channel as well as a texture coordinate. The controller 131 may obtain a sampling frequency for a texture. The controller 131 may determine the channel having the highest spatial frequency as a reference channel based on the spatial frequency information for each channel, and may determine the filtering control signal of the reference channel based on the spatial frequency of the reference channel and the sampling frequency. The controller 131 may compare the spatial frequency of the reference channel and the spatial frequencies of other channels excluding the reference channel, and determine the filtering control signal of the other channels excluding the reference channel.

Since the sampling frequency of every channel is the same, the filtering control signal of the reference channel may be determined first, and the filtering control signal of each of other channels may be determined in consideration of the spatial frequency relation of the reference channel and the respective other channels.

Figure 6:
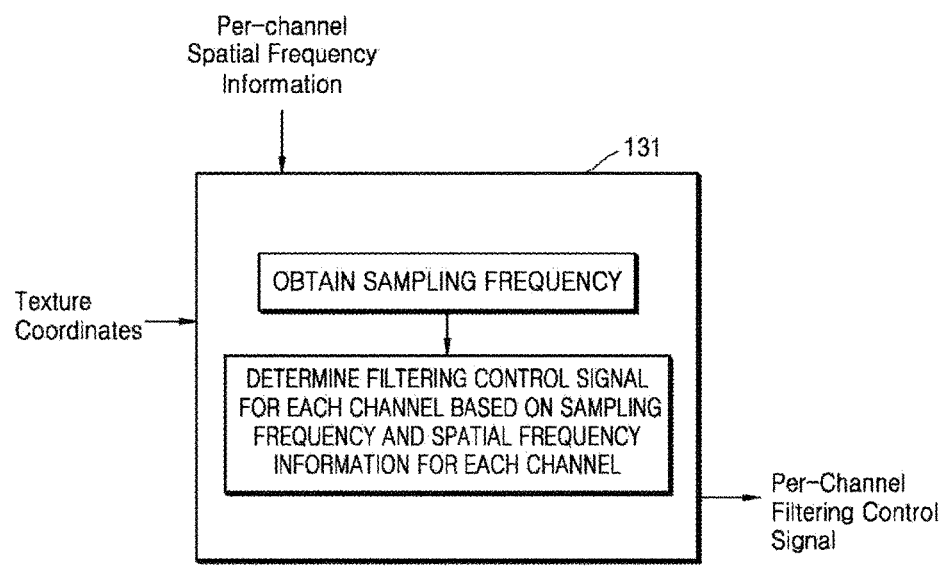
FIG. 6 is a diagram describing an operation of a controller according to an embodiment.

FIG. 6 is a diagram describing an operation of a controller according to an embodiment. The controller 131 is a diagram describing an example of determining the filtering control signal for each channel.

Referring to FIG. 6, the controller 131 may obtain spatial frequency information for each channel as well as a texture coordinate. The controller 131 may obtain a sampling frequency for a texture. The controller 131 may compare the spatial frequency for each channel included in the spatial frequency information for each channel and the sampling frequency, and determine the filtering control signal for each respective channel. This method simultaneously obtains the filtering control signal for each channel for all channels.

Hereinafter, how the texture filter 137 operates according to the filtering control signal for each channel determined by the controller 131 will be described using the anti-aliasing filtering operation of the original texture a shown in FIG. 4A as an example.

Figure 7:
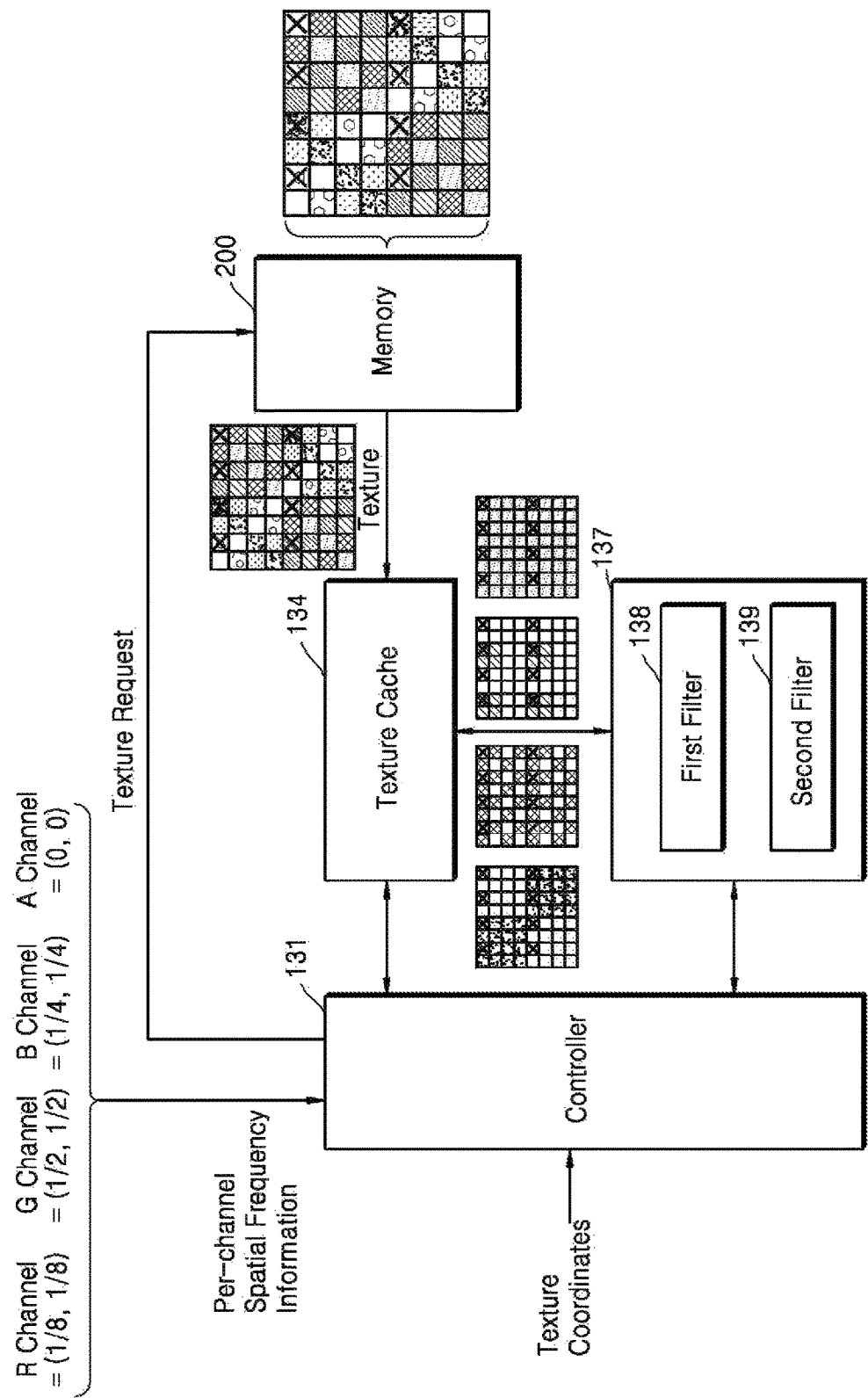
FIG. 7 is a diagram describing an operation of a texture processing unit according to an embodiment.

FIG. 7 is a diagram describing an operation of a texture processing unit according to an embodiment.

The controller 131 may obtain a texture coordinate. The controller 131 may request a texture corresponding to the texture coordinate in the memory 200 based on the obtained texture coordinate.

The controller 131 may obtain spatial frequency information for each channel of the requested texture. The controller 131 may obtain the spatial frequency information for each channel of the texture in various ways. For example, when the spatial frequency information for each channel is stored together in the memory 200 in which the texture is stored, the controller 131 may obtain the spatial frequency information for each channel from the memory 200. When decompressing a compressed texture of each channel and storing the decompressed texture in the texture cache 134, the controller 131 may obtain compression rate information of the texture, and may obtain the spatial frequency information for each channel from the compression rate information. When the texturing operation is performed in the graphics processing unit 100 including the texture processing unit 130, the controller 131 may obtain the spatial frequency information for each channel which is calculated in real-time from the graphics processing unit 100.

The controller 131 may determine the filtering control signal of each channel of the texture based on the obtained spatial frequency information for each channel. When the spatial frequencies of channels included in the spatial frequency information for each channel are different from each other, the controller 131 may determine the filtering control signal independently for each channel in each channel. The controller 131 may determine the filtering control signal for each channel so that anti-aliasing filtering based on the spatial frequency of the channel is performed on the channel satisfying a predetermined condition in which the aliasing phenomenon occurs.

As described above in FIGS. 4A-4E, the original texture may be divided into image signals of the R channel, the G channel, the B channel, and the A channel of the RGBA color space, the spatial frequencies of the X axis and the Y axis of each channel may be the same, and the spatial frequencies of the channels may be ⅛, ½, ¼, and 0, respectively. In this case, the sampling frequency of each channel is ½ in the X axis direction, and ¼ in the Y axis direction.

The controller 131 may find the channel satisfying the predetermined condition in which the aliasing phenomenon occurs based on the spatial frequency information for each channel of the original texture. For example, when the sampling frequency is smaller than two times the spatial frequency of the channel, the aliasing phenomenon may occur in a corresponding axis direction of a corresponding channel. In the case of the G channel, since two times the spatial frequency of the X axis and the Y axis of the image signal is greater than the sampling frequency, the aliasing phenomenon may occur in both the X axis and the Y axis of the image signal of the G channel. In the B channel, since the spatial frequency of the Y axis of the image signal is two times greater than the sampling frequency of the Y axis, the aliasing phenomenon may occur in the Y axis of the image signal of the B channel. The controller 131 may locate the channel or channels in which the aliasing phenomenon occurs by the method described above. The controller 131 may determine the filtering control signal for each channel so that the anti-aliasing filtering is performed on the channel satisfying the predetermined condition in which the aliasing phenomenon occurs.

The texture cache 134 may receive the texture requested by the controller 131 from the memory 200. Referring to FIG. 7, the texture cache 134 may receive the original texture stored in the memory 200 from the memory 200, and may store the original texture.

The controller 131 may control the texture cache 134 to read the image signal for each channel of the texture stored in the texture cache 134 and transmit the image signal to the texture filter 137. The controller 131 may transmit the filtering control signal for each channel to the texture filter 137 so that the anti-aliasing filtering is performed on the portion of the channels satisfying the predetermined condition in which the aliasing phenomenon occurs. The filtering control signal for each channel may further include the control signal for each channel for a filtering mode requested by an application program executed on a non-transitory hardware device as well as the control signal for each channel for the anti-aliasing filtering.

The texture filter 137 may include a first filter 138 including anti-aliasing filters corresponding to the channels included in the texture, and a second filter 139 including filters performing filtering according to the filtering mode requested by the application program. The texture filter 137 may operate the first filter 138 and the second filter 139 for each channel according to the filtering control signal for each channel transmitted from the controller 131. The texture filter 137 may independently operate at least one filter corresponding to each channel according to the filtering control signal for each channel.

Hereinafter, referring to FIGS. 8 and 9, examples in which an original texture is received from the memory 200, and isotropic anti-aliasing filtering and anisotropic anti-aliasing filtering are performed on the G channel and the B channel, respectively, in which the aliasing phenomenon occurs will be described.

Figure 8:
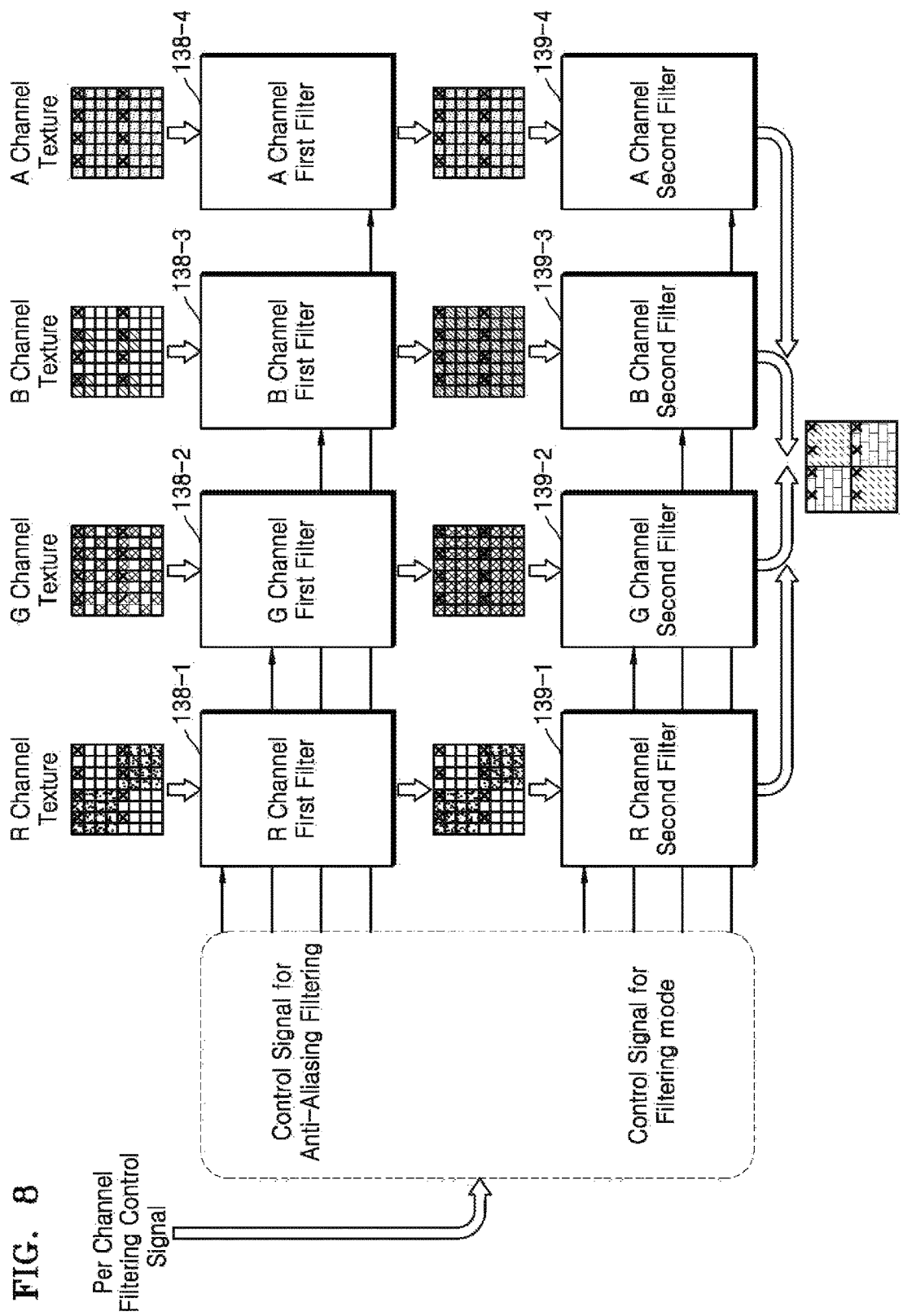
FIG. 8 is a diagram describing a configuration of a texture filter according to an embodiment.

FIG. 8 is a diagram describing a configuration and an operation of a texture filter according to an embodiment.

Isotropic anti-aliasing filtering is a method of applying the same low pass filter to every direction of the image. Isotropic anti-aliasing filtering is a method of determining a low pass filter coefficient based on the direction having the smallest sampling frequency even when the sampling frequency is different according to the direction of the image, and applying the determined low pass filter coefficient to every direction.

As described above referring to FIG. 7, the original texture may be received in the texture cache 134 in response to the texture request of the controller 131. The controller 131 may control reading the image signal for each channel of the original texture stored in the texture cache 134, and transmitting the image signal to the texture filter 137.

Referring to FIG. 8, the image signal for each channel of the original texture may pass at least one filter corresponding to each channel. The filtering control signal for each channel may be transmitted to a first filter 138-1, 138-2, 138-3, or 138-4 for each respective channel so that the anti-aliasing filtering is performed on a portion of the channels satisfying the predetermined condition determining where the aliasing phenomenon occurs. The control signal for each channel for the anti-aliasing filtering may independently operate the first filter 138-1, 138-2, 138-2, or 138-4 for each channel.

As described above, in order to address the aliasing phenomenon occurring in the X axis and the Y axis of the G channel and the Y axis of the B channel, the texture filter 137 may independently operate only the first filter 138-2 of the G channel and the first filter 138-3 of the B channel for only the G channel and the B channel.

The first filter 138-2 of the G channel and the first filter 138-3 of the B channel may perform the anti-aliasing filtering by applying the low pass filter corresponding to the smallest sampling frequency among the sampling frequencies according to the direction of the image of each channel to every direction of the image. Since the G channel has the sampling frequency of ½ in the X axis direction and the sampling frequency of ¼ in the Y axis direction, the first filter 138-2 of the G channel may perform the anti-aliasing filtering every four texels in the X axis direction and the Y axis direction based on the sampling frequency of ¼. The first filter 138-3 of the B channel may perform the anti-aliasing filtering based on the sampling frequency of the Y axis direction on both the X axis direction and the Y axis direction when the aliasing phenomenon occurs in the Y axis direction of the B channel even when the aliasing phenomenon does not occur in the X axis direction of the B channel. Since the B channel has the sampling frequency of ¼ in the Y axis direction, the anti-aliasing filtering may be performed every four texels in the X axis direction and the Y axis direction.

The first filter 138-1 of the R channel and the first filter 138-4 of the A channel corresponding to the R channel and the A channel may not perform the anti-aliasing filtering. As such, the texture filter 137 may independently operate the first filter 138-1, 138-2, 138-3, or 138-4 for each channel based on the spatial frequency information for each channel.

When the filtering control signal for each channel further includes the control signal for each channel for the filtering mode requested by the application program as well as the control signal for each channel for the anti-aliasing filtering, a second filter 139-1, 139-2, 139-3, or 139-4 for each channel may be independently operated.

Figure 9:
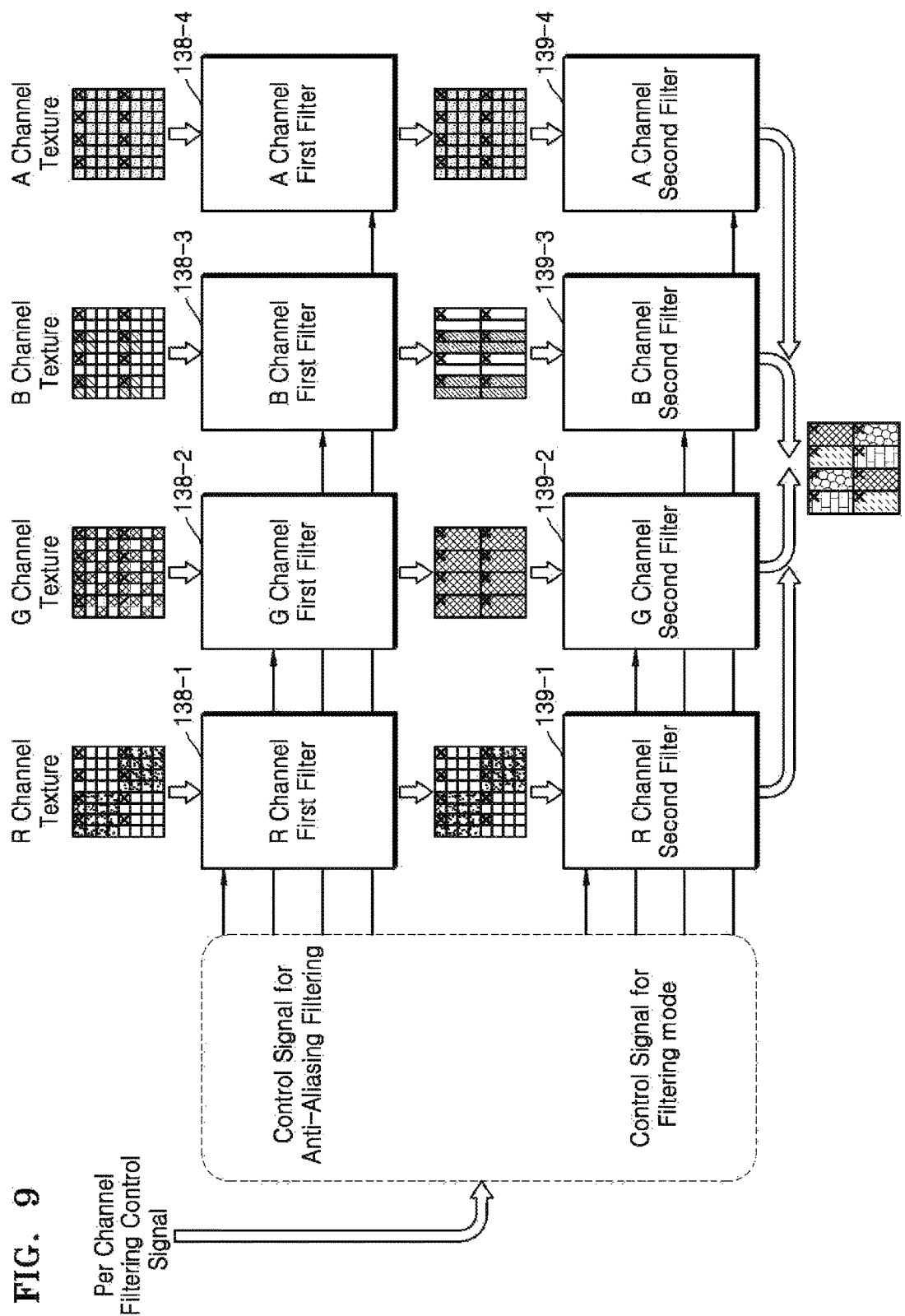
FIG. 9 is a diagram describing a configuration and an operation of a texture filter according to an embodiment.

FIG. 9 is a diagram describing a configuration and an operation of a texture filter according to an embodiment.

Anisotropic anti-aliasing filtering is a method of applying a different low pass filter according to a direction based on sampling frequency of each direction of an image. Anisotropic anti-aliasing filtering is a method of determining a low pass filter coefficient corresponding to each sampling frequency and applying a different low pass filter to each direction when the sampling frequency is different according to the direction of the image.

As described in FIG. 7, the original texture may be received in the texture cache 134 in response to the texture request of the controller 131. The controller 131 may control reading of the image signal for each channel of the original texture stored in the texture cache 134, and control transmitting to the texture filter 137.

Referring to FIG. 9, the image signal for each channel of the original texture may pass at least one filter corresponding to each channel. The filtering control signal for each channel may be transmitted to the first filter 138-1, 138-2, 138-3, or 138-4 for each channel so that the anti-aliasing filtering is performed on a portion of the channels satisfying the predetermined condition in which the aliasing phenomenon occurs. The control signal for the anti-aliasing filtering may independently operate the first filter 138-1, 138-2, 138-3, or 138-4 for each channel.

As described above, in order to address the aliasing phenomenon occurring in the X axis and the Y axis of the G channel and the Y axis of the B channel, the texture filter 137 may independently operate the first filter 138-2 of the G channel and the first filter 138-3 of the B channel for only the G channel and the B channel.

The first filter 138-2 of the G channel may perform the anti-aliasing filtering on the X axis and the Y axis of the G channel. Since the G channel has the sampling frequency of ½ in the X axis direction and the sampling frequency of ¼ in the Y axis direction, the anti-aliasing filtering may be performed every two texels in the X axis direction and every four texels in the Y axis direction. The first filter 138-3 of the B channel may perform the anti-aliasing filtering in the Y axis direction of the B channel. Since the B channel has the sampling frequency of ¼ in the Y axis direction, the anti-aliasing filtering may be performed every four texels in the Y axis direction. Since the aliasing phenomenon does not occur in the X axis direction of the B channel, the anti-aliasing filtering may not be performed in the X axis direction.

The first filter 138-1 of the R channel and the first filter 138-4 of the A channel corresponding to the R channel and the A channel may not perform the anti-aliasing filtering. As such, the texture filter 137 may independently operate the first filter 138-1, 138-2, 138-3, or 138-4 for each channel based on the spatial frequency information for each channel.

When the filtering control signal for each channel further includes the control signal for each channel for the filtering mode requested by the application program, as well as the control signal for each channel for the anti-aliasing filtering, the texture filter 137 may independently operate the second filter 139-1, 139-2, 139-3, or 139-4 for each channel.

Figure 10:
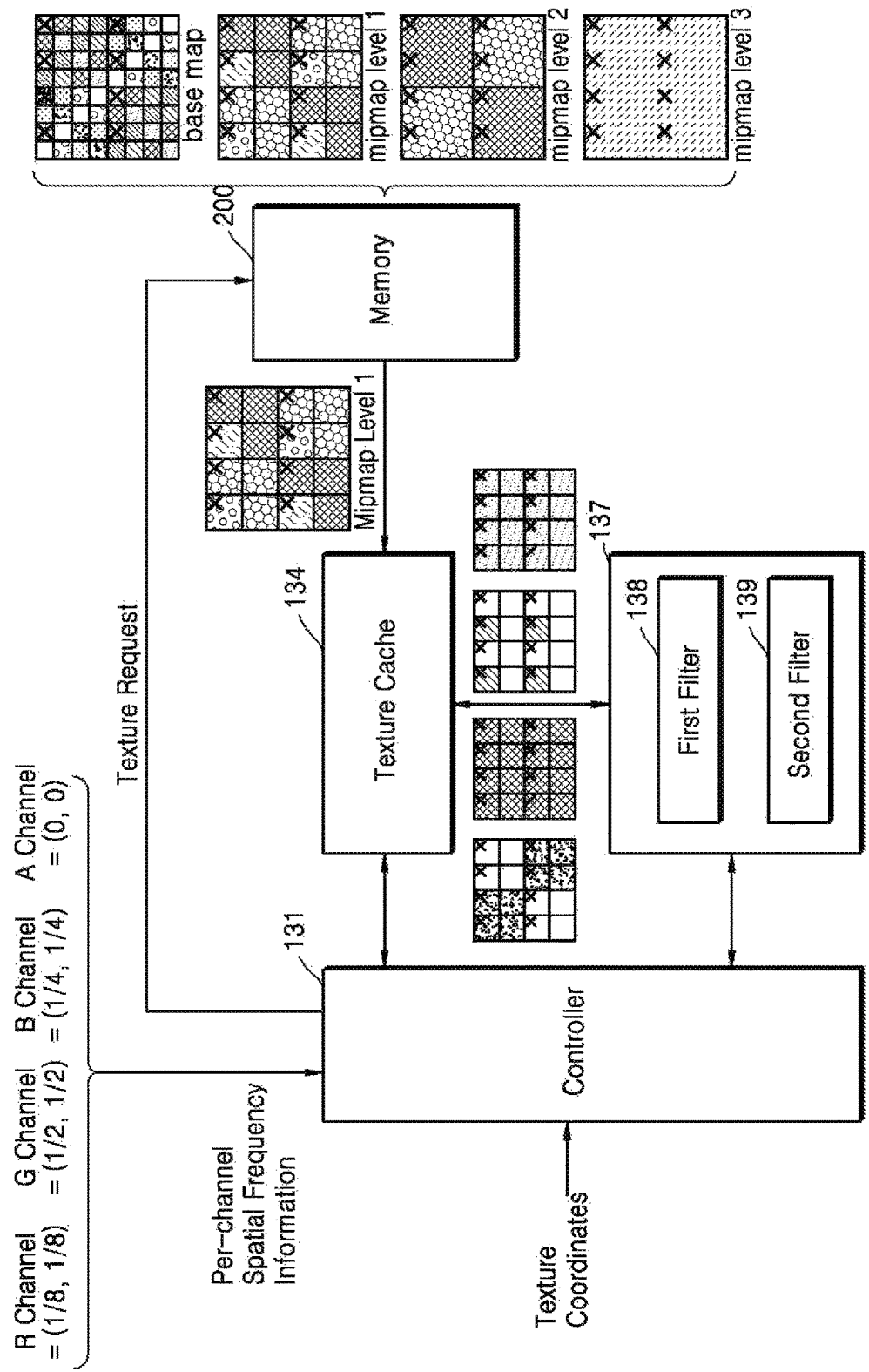
FIG. 10 is a diagram describing an operation of a texture processing unit according to an embodiment.

FIG. 10 is a diagram describing an operation of a texture processing unit according to an embodiment.

In contrast to FIG. 7, FIG. 10 illustrates an example in which the original texture and mipmaps decreasing the resolution of the original texture are stored in the memory 200, and the mipmaps are used for the texture filtering. Full description of aspects similar to that already described with reference to FIG. 7 will be omitted.

The controller 131 may obtain the texture coordinate. The controller 131 may request the texture corresponding to the texture coordinate to the memory 200 based on the obtained texture coordinate.

The controller 131 may obtain the spatial frequency information for each respective channel of the requested texture. The controller 131 may determine the filtering control signal for each respective channel of the texture based on the obtained spatial frequency information for each channel.

As described above with reference to FIG. 4, the original texture may be divided into the image signals of the R channel, the G channel, the B channel, and the A channel of the RGBA color space, and the spatial frequencies of the X axis and Y axis for each channel may be the same, and be ⅛, ½, ¼, and 0, respectively. In this case, the sampling frequency for each channel may be ½ in the X axis direction and ¼ in the Y axis direction.

The controller 131 may find a channel or channels satisfying the predetermined condition in which the aliasing phenomenon occurs based on the spatial frequency information for each channel of the original texture. As described above with reference to FIG. 7, In the G channel, since the spatial frequency of the X axis and the Y axis of the image signal is two times greater than the sampling frequency, the aliasing phenomenon may occur in both the X axis and the Y axis of the image signal of the G channel. In the B channel, since the spatial frequency of the Y axis of the image signal is two times greater than the sampling frequency of the Y axis, the aliasing phenomenon may occur in the Y axis of the image signal of the B channel.

The controller 131 may determine the filtering control signal for each channel so that the anti-aliasing filtering is performed on the G channel and the B channel satisfying the predetermined condition in which the aliasing phenomenon occurs. In this case, the anti-aliasing filtering on the axis having the great sampling frequency may be addressed by using the mipmap suitable for the original texture.

In the G channel, the aliasing phenomenon may be generated in both the X axis having high sampling frequency and the Y axis having a low sampling frequency, and in the B channel, the aliasing phenomenon may be generated only in the Y axis. In this case, the axis having the low sampling frequency may be a major axis, and the axis having the high sampling frequency may be a minor axis. An effect of the anti-aliasing filtering may be obtained by suitably selecting a mipmap in which the resolution is not decreased while the aliasing phenomenon does not occur on the minor axis having the high sampling frequency. The anti-aliasing filtering may be performed by further applying the low pass filter to the major axis having the low sampling frequency.

Referring to FIG. 10, a mipmap level 1 may be received in the texture cache 134 in response to the texture request of the controller 131. Since the mipmap level 1 is a mipmap in which the resolutions of both the X axis and the Y axis is decreased by ½ with respect to the original texture, it may correspond to a result of passing a predetermined low pass filter. The texture cache 134 may receive the mipmap level 1 used for the texture filtering among the mipmaps stored in the memory 200 from the memory 200, and may store the mipmap level 1.

The controller 131 may read the image signal for each channel of the mipmap stored in the texture cache 134, and control to transmit to the texture filter 137. The controller 131 may transmit the filtering control signal for each channel to the texture filter 137 so that the anti-aliasing filtering is performed on a portion of the channels satisfying the predetermined condition in which the aliasing phenomenon occurs. The filtering control signal for each channel may further include the control signal for each channel for the filtering mode requested by the application program as well as the control signal for each channel for the anti-aliasing filtering.

The texture filter 137 may include a first filter 138 including anti-aliasing filters corresponding to the channels configuring the texture, and a second filter 139 including filters performing the filtering according to the filtering mode requested by the application program. The texture filter 137 may operate the first filter 138 and the second filter 139 for each channel according to the filtering control signal for each channel transmitted from the controller 131. The texture filter 137 may independently operate at least one filter corresponding to each channel according to the filtering control signal for each channel.

Hereinafter, an example of receiving the mipmap corresponding to the original texture from the memory 200, and performing anisotropic anti-aliasing filtering with the mipmap on the G channel and the B channel in which the aliasing phenomenon occurs will be described below with reference to FIG. 11.

Figure 11:
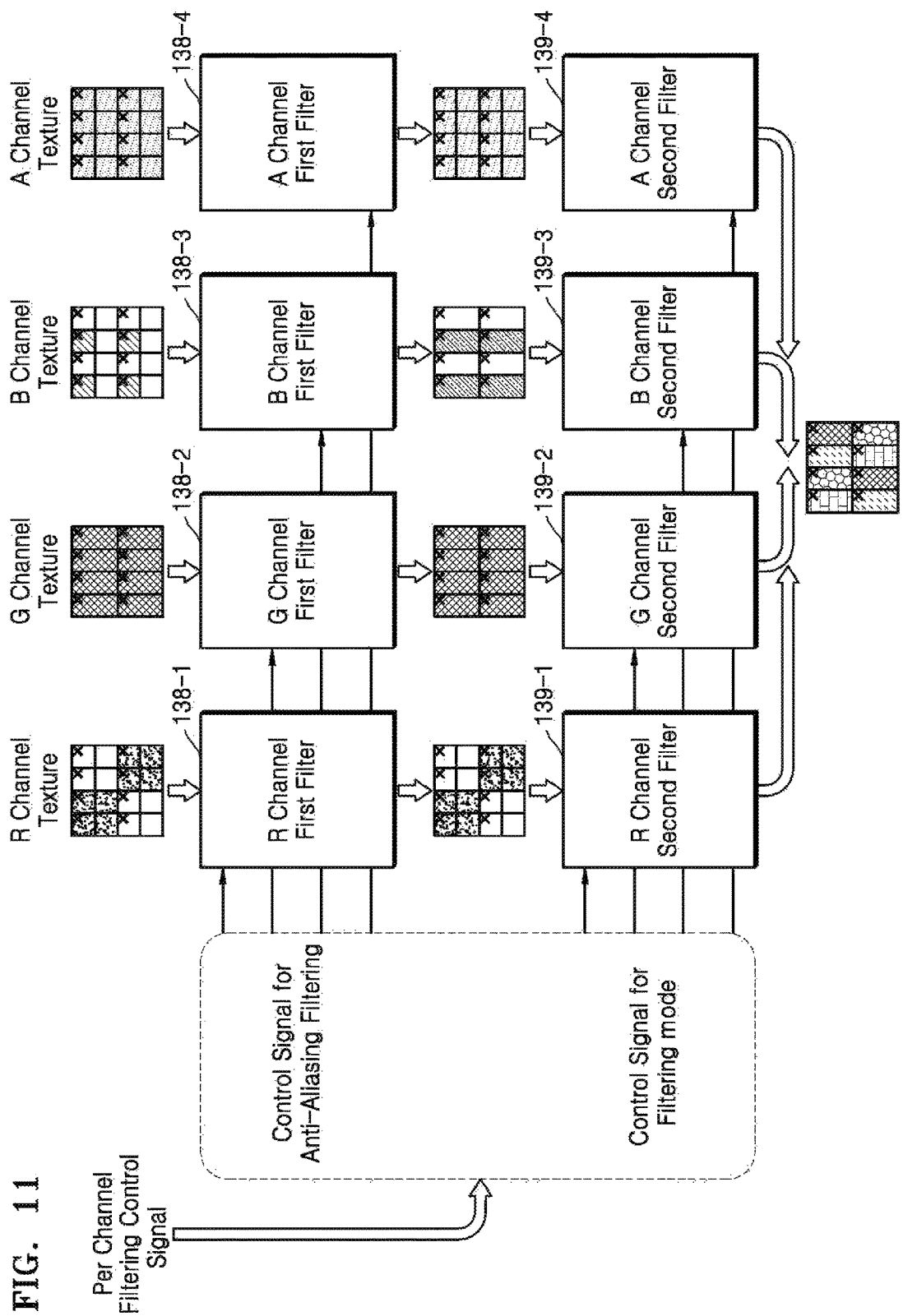
FIG. 11 is a diagram describing a configuration and an operation of a texture filter according to an embodiment.

FIG. 11 is a diagram describing a configuration and an operation of a texture filter according to an embodiment.

The anisotropic anti-aliasing filtering with a mipmap is a method of preventing the aliasing phenomenon using the mipmap with respect to a direction having a high sampling frequency in the image, and applying a low pass filter based on the sampling frequency to a direction having a low sampling frequency.

As described above with reference to FIG. 10, the mipmap level 1 may be received in the texture cache 134 in response to the texture request of the controller 131. The controller 131 may control reading of the image signal for each corresponding channel of the mipmap stored in the texture cache 134, and may control transmitting to the texture filter 137.

Referring to FIG. 11, the image signal for each channel of the mipmap level 1 may pass at least one filter corresponding to each channel. Since the mipmap level 1 has a resolution of ½ compared with the original texture, the image signal for each channel of the mipmap level 1 may also have the resolution of ½. That is, since the resolution of the mipmap level 1 is decreased by ½ compared with the original texture, a result which is equal to that of the anti-aliasing filtering being performed on the X axis of the G channel may be shown.

Since the sampling frequency is ¼ with respect to the Y axis of the G channel and the Y axis of the B channel, the aliasing phenomenon occurring in the Y axis direction may not be addressed using the mipmap level 1. Accordingly, the low pass filter may be applied to the Y axis of the G channel and the Y axis of the B channel, and, thus the aliasing phenomenon may be mitigated. The control signal for each channel for the anti-aliasing filtering may independently operate the first filter 138-1, 138-2, 138-3, or 138-4 for each channel. That is, in this example, the texture filter 137 may independently operate the first filter 138-2 of the G channel and the first filter 138-3 of the B channel in only the Y axis direction which is the major axis of the G channel and the B channel. Since the G channel and the B channel have the sampling frequency of ¼ in the Y axis direction, the first filter 138-2 of the G channel and the first filter 138-3 of the B channel may perform the anti-aliasing filtering every four texels in the Y axis direction.

The first filter 138-1 of the R channel and the first filter 138-4 of the A channel corresponding to the R channel and the A channel may not perform the anti-aliasing filtering. As such, the texture filter 137 may independently operate the first filter 138-1, 138-2, 138-3, or 138-4 for each channel based on the spatial frequency information for each channel.

When the filtering control signal for each channel further includes the control signal for each channel for the filtering mode requested by the application program as well as the control signal for each channel for the anti-aliasing filtering, the texture filter 137 may independently operate the second filter 139-1, 139-2, 139-3, or 139-4 for each channel.

Figure 12:
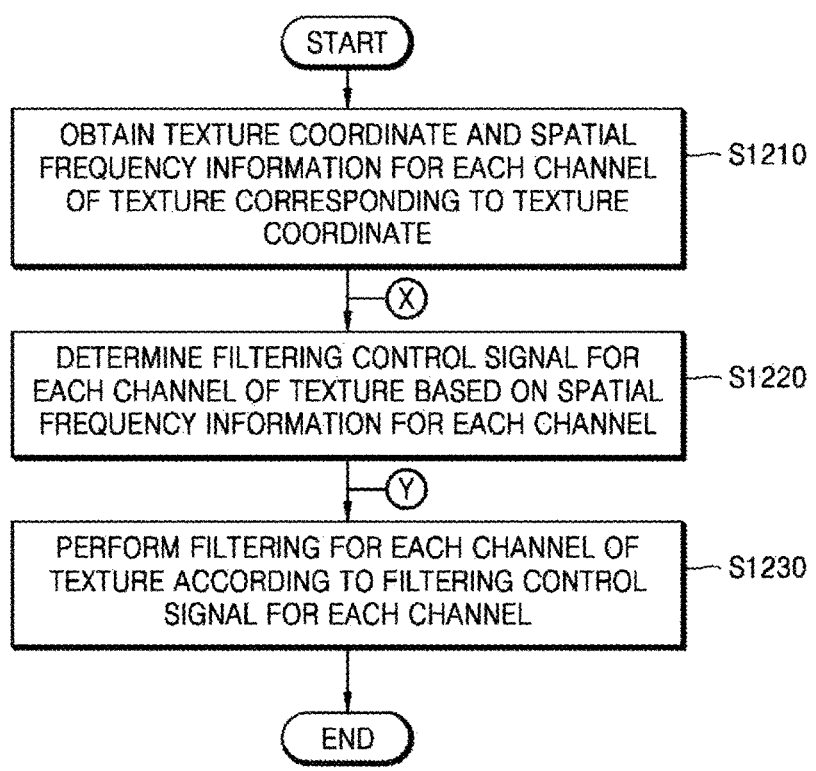
FIG. 12 is a flowchart describing a texture processing method according to an embodiment.

FIG. 12 is a flowchart describing a texture processing method according to an embodiment.

In operation S1210, the texture processing unit 130 may obtain a texture coordinate and spatial frequency information for each channel of a texture corresponding to the texture coordinate.

Since the spatial frequency information for each channel of the texture is generated together when generating the texture and is stored together in the external memory 200 in which the texture is stored, the controller 131 may obtain the spatial frequency information for each channel from the memory 200.

The controller 131 may obtain compression rate information for each channel of the texture from the decompressor (not shown) decompressing the compressed texture transmitted from the memory 200. The controller 131 may determine the spatial frequency information for each channel of the texture based on the compression rate information for each channel. Since the spatial frequency of the channel is low in a channel having a high compression rate, and the spatial frequency of the channel is high in a channel having a low compression rate, the spatial frequency information may be determined using the correlation between the compression rate and the spatial frequency.

The spatial frequency information for each channel of the texture may be calculated in real time when performing the texturing operation by the graphics processing unit 100 including the texture processing unit 130. The controller 131 may obtain the calculated spatial frequency information for each channel from the graphics processing unit 100.

The spatial frequency information for each respective channel of the texture may be directly input through an application program executed by the graphics processing unit 100, which is a non-transitory hardware device.

In operation S1220, the texture processing unit 130 may determine a filtering control signal for each respective channel of the texture based on the spatial frequency information for each channel.

The texture processing unit 130 may determine the filtering control signal independently for each channel when the spatial frequencies of the channels included in the spatial frequency information for respective channels are different from each other. The texture processing unit 130 may determine the filtering control signal for each channel so that anti-aliasing filtering based on the spatial frequency of the channel is performed on a channel satisfying the predetermined condition in which an aliasing phenomenon occurs. The filtering control signal for each channel may include a control signal for each channel for the anti-aliasing filtering. The filtering control signal for each channel may further include the control signal for each respective channel for a filtering mode requested by an application program executed on a non-transitory hardware device, as well as the control signal for each channel for the anti-aliasing filtering.

Figure 13:
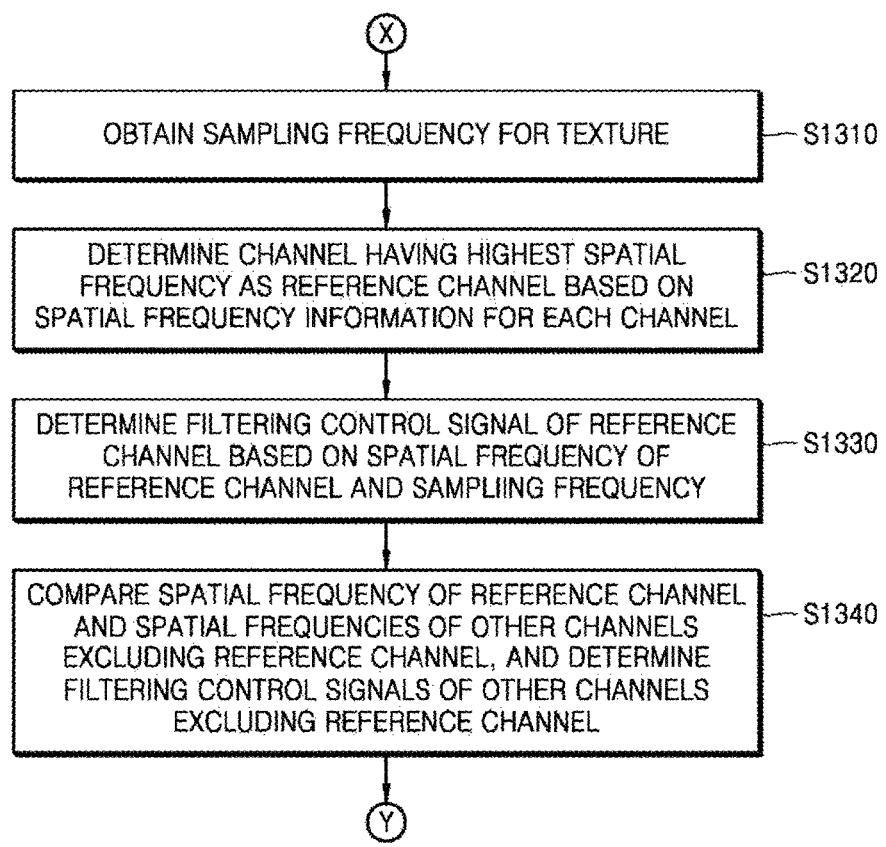
FIG. 13 is a detailed flowchart describing an operation of determining a filtering control signal for each channel in a texture processing method according to an embodiment.

FIG. 13 is a detailed flowchart for describing an operation of determining a filtering control signal for each channel in a texture processing method according to an embodiment.

In operation S1310, the texture processing unit 130 may obtain a sampling frequency for a texture.

In operation S1320, the texture processing unit 130 may determine a channel having the highest spatial frequency as a reference channel based on the spatial frequency information for each channel.

In operation S1330, the texture processing unit 130 may determine a filtering control signal of the reference channel based on the spatial frequency of the reference channel and the sampling frequency.

In operation S1340, the texture processing unit 130 may compare the spatial frequency of the reference channel and the spatial frequencies of other channels excluding the reference channel, and determine filtering control signals of the other channels excluding the reference channel.

Figure 14:
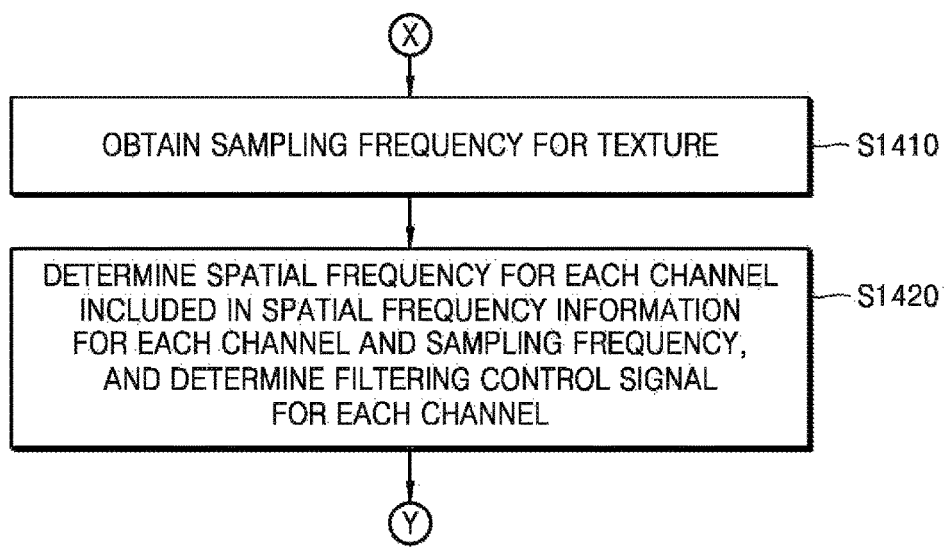
FIG. 14 is a detailed flowchart describing an operation of determining a filtering control signal for each channel in a texture processing method according to an embodiment.

FIG. 14 is a detailed flowchart describing an operation of determining a filtering control signal for each channel in a texture processing method according to an embodiment.

In operation S1410, the texture processing unit 130 may obtain a sampling frequency for a texture.

In operation S1420, the texture processing unit 130 may compare the spatial frequency for each channel included in spatial frequency information for each channel and the sampling frequency, and determine a filtering control signal for each channel.

Referring to FIG. 12 again, in operation S1230, the texture processing unit 130 may perform filtering for each channel on the texture according to the filtering control signal for each channel.

The texture processing unit 130 may operate the first filter including anti-aliasing filters corresponding to the channels configuring the texture and the second filter including filters performing filtering according to a filtering mode requested by an application program, for each channel according to the filtering control signal for each channel.

The apparatuses, units, modules, devices, and other components illustrated in FIGS. 1-14 that perform the operations described herein with respect to FIGS. 1-14 are implemented by hardware components. Examples of hardware components include controllers, sensors, generators, drivers, and any other electronic components known to one of ordinary skill in the art. The hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art, upon full understanding of the present disclosure, that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-14. The hardware components also may access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described herein with respect to FIGS. 1-14 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. The instructions or software include machine code that is directly executed by the processor or computer, such as machine code produced by a compiler. In another example, the instructions or software include higher-level code that is executed by the processor or computer using an interpreter. Programmers of ordinary skill in the art with a full understanding of the present disclosure can readily write the instructions or software based on the block diagrams and the flow charts illustrated in the drawings and the corresponding descriptions in the specification, which disclose algorithms for performing the operations performed by the hardware components and the methods as described above. The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A texture processing unit, comprising:
   a controller configured to obtain a texture coordinate and spatial frequency information for each channel of a texture corresponding to the texture coordinate, wherein the controller obtains the spatial frequency information from a memory in which the texture is stored, obtains a sampling frequency for the texture, and determines a filtering control signal for each channel of the texture based on the spatial frequency information for each channel and the sampling frequency; and
   a texture filter configured to perform a respective filtering method suitable for each channel of the texture according to the filtering control signal for each corresponding channel so as to minimize unnecessary filtering operations,
   wherein the controller determines the filtering control signal independently for each channel of the texture in response to a respective spatial frequency for each channel included in the spatial frequency information for each channel of the texture being different.

2. The texture processing unit of claim 1, wherein the controller determines the filtering control signal for each channel such that anti-aliasing filtering based on a respective spatial frequency of a channel is performed on a channel satisfying a predetermined condition determining that an aliasing phenomenon occurs in the channel.

3. The texture processing unit of claim 1, wherein the spatial frequency information for each channel is respectively generated and stored together in response to the texture being generated.

4. The texture processing unit of claim 1, wherein the spatial frequency information for each channel is determined in real time, respectively, in response to texturing being performed by a graphics processing unit comprising the texture processing unit, and
the controller obtains the spatial frequency information for each respective channel from the graphics processing unit.

5. The texture processing unit of claim 1, wherein the controller, determines a channel having a highest spatial frequency as a reference channel based on the spatial frequency information for each channel, determines the filtering control signal of the reference channel based on the spatial frequency of the reference channel and the sampling frequency, compares the spatial frequency of the reference channel and respective spatial frequencies of other channels excluding the reference channel, and determines the filtering control signals of the other channels excluding the reference channel.

6. The texture processing unit of claim 1, wherein the controller compares the respective spatial frequency for each channel included in the spatial frequency information for each channel, and the sampling frequency, and determines the filtering control signal for each channel.

7. The texture processing unit of claim 1, wherein the texture filter independently operates at least one filter corresponding to each channel based on the filtering control signal for each respective channel.

8. The texture processing unit of claim 1, wherein the texture filter comprises a first filter comprising anti aliasing filters corresponding to channels configuring the texture and a second filter comprising filters performing a filtering according to a filtering mode, and operates the first filter and the second filter or each channel according to the filtering control signal for each channel.

9. The texture processing unit of claim 1, wherein the filtering control signal for each channel comprises a control signal for each channel for anti-aliasing filtering, and a control signal for each channel for a filtering mode.

10. The texture processing unit of claim 1, further comprising a texture cache configured to store the texture.

11. A texture processing method, comprising:
obtaining a texture coordinate and spatial frequency information for each channel of a texture corresponding to the texture coordinate by retrieving the spatial frequency information from a memory in which the texture is stored, and obtaining a sampling frequency for the texture;
determining a filtering control signal for each channel of the texture based on the spatial frequency information for each channel and the sampling frequency; and
performing a respective filtering method suitable for each channel of the texture according to the filtering control signal for each corresponding channel so as to minimize unnecessary filtering operations,
wherein the determining of the filtering control signal for each channel comprises determining the filtering control signal independently for each channel of the texture in response to a spatial frequency for each channel included in the spatial frequency information for each channel of the texture being different.

12. The texture processing method of claim 11, wherein the determining of the filtering control signal for each channel comprises determining the filtering control signal for each channel so that anti-aliasing filtering based on a spatial frequency of a channel is performed on a channel satisfying a predetermined condition that determines if an aliasing phenomenon occurs.

13. The texture processing method of claim 11, wherein the spatial frequency information for each channel is generated and stored together in response to the texture being generated, and
the obtaining of the texture coordinate and the spatial frequency information for each channel comprises obtaining the spatial frequency information for each channel from an external memory in which the texture is stored.

14. The texture processing method of claim 11, wherein the spatial frequency information for each channel is determined in real time in response to texturing being performed in a graphics processing unit comprising a texture processing unit, and
the obtaining of the texture coordinate and the spatial frequency information for each channel comprises obtaining the spatial frequency information for each respective channel from the graphics processing unit.

15. The texture processing method of claim 11, wherein the determining of the filtering control signal for each channel comprises:
determining a channel having a highest spatial frequency as a reference channel based on the spatial frequency information for each channel;
determining the filtering control signal of the reference channel based on the spatial frequency of the reference channel and the sampling frequency; and
comparing the spatial frequency of the reference channel and spatial frequencies of other channels excluding the reference channel, and determining the filtering control signals of the other channels excluding the reference channel.

16. The texture processing method of claim 11, wherein the determining of the filtering control signal for each channel comprises:
comparing the spatial frequency for each channel included in the spatial frequency information for each channel and the sampling frequency, and determining the filtering control signal for each respective channel.

17. The texture processing method of claim 11, wherein the performing of the filtering for each channel comprises operating a first filter comprising anti-aliasing filters corresponding to channels configuring the texture and a second filter comprising filters performing filtering according to a filtering mode, for each channel according to the filtering control signal for each respective channel.

18. The texture processing method of claim 11, wherein the filtering control signal for each channel comprises a control signal for each channel for anti-aliasing filtering, and a control signal for each channel for a filtering mode.

19. The texture processing unit of claim 1, wherein the memory includes a texture cache, and the controller is configured to control a reading of an image signal for each channel of an original texture from the texture cache.

20. The texture processing unit of claim 19, wherein the controller is further configured to retrieve from the memory a mipmap corresponding to the original texture to provide anisotropic anti-aliasing filtering.

21. The method according to claim 11, wherein in response to determining the spatial frequency information and the texture corresponding to the texture coordinate retrieved from the memory is stored in a compressed form, performing a decompression operation to decompress a compressed texture of each channel and storing the decompressed texture in a texture cache.

22. The method according to claim 21, wherein prior to performing the decompression operation to decompress a compressed texture for each channel, obtaining compression rate information of the texture, and obtaining the spatial frequency information for each channel from the compression rate information.

* * * * *